(12) United States Patent
Liang

(10) Patent No.: US 9,400,383 B2
(45) Date of Patent: Jul. 26, 2016

(54) LIGHT BLOCKING PLATE AND LENS ASSEMBLY INCLUDING THE SAME

(71) Applicant: Newmax Technology Co., Ltd., Taichung (TW)

(72) Inventor: Yung-Fu Liang, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 0 days.

(21) Appl. No.: 14/566,247

(22) Filed: Dec. 10, 2014

(65) Prior Publication Data

US 2016/0170204 A1    Jun. 16, 2016

(51) Int. Cl.
*G02B 9/00* (2006.01)
*G02B 27/00* (2006.01)
*G02B 7/02* (2006.01)

(52) U.S. Cl.
CPC ............ *G02B 27/0025* (2013.01); *G02B 7/021* (2013.01)

(58) Field of Classification Search
USPC .................................. 359/738–740, 819–830
See application file for complete search history.

(56) References Cited

U.S. PATENT DOCUMENTS

| | | | | |
|---|---|---|---|---|
| 2009/0310236 A1* | 12/2009 | Wu | .................. | G02B 7/021 359/820 |
| 2010/0259840 A1* | 10/2010 | Chang | .................. | G02B 5/208 359/738 |
| 2010/0290137 A1* | 11/2010 | Lin | .................. | G02B 7/021 359/819 |
| 2011/0026146 A1* | 2/2011 | Hirabayashi | .......... | G02B 5/005 359/819 |

FOREIGN PATENT DOCUMENTS

| TW | 201020089 | 6/2010 |
|---|---|---|
| TW | 201123869 | 7/2011 |
| TW | 201307935 | 2/2013 |

* cited by examiner

*Primary Examiner* — Mohammed Hasan
(74) *Attorney, Agent, or Firm* — Muncy, Geissler, Olds & Lowe, P.C.

(57) ABSTRACT

A light blocking plate is adapted for being installed on a lens wherein the lens has an optical portion and a positioning portion surrounding the optical portion. The light blocking plate includes an annular body which is formed with a through hole at a central portion thereof. The annular body has a first face and a second face. The annular body has an inner rim and an outer rim. The through hole is defined by the inner rim. One of the first face and the second face is adapted for being disposed on the positioning portion of the lens. The inner rim is formed with a plurality of notches so that the inner rim has a contour which is not smooth circular. Thus, halo disturbance can be reduced.

16 Claims, 13 Drawing Sheets

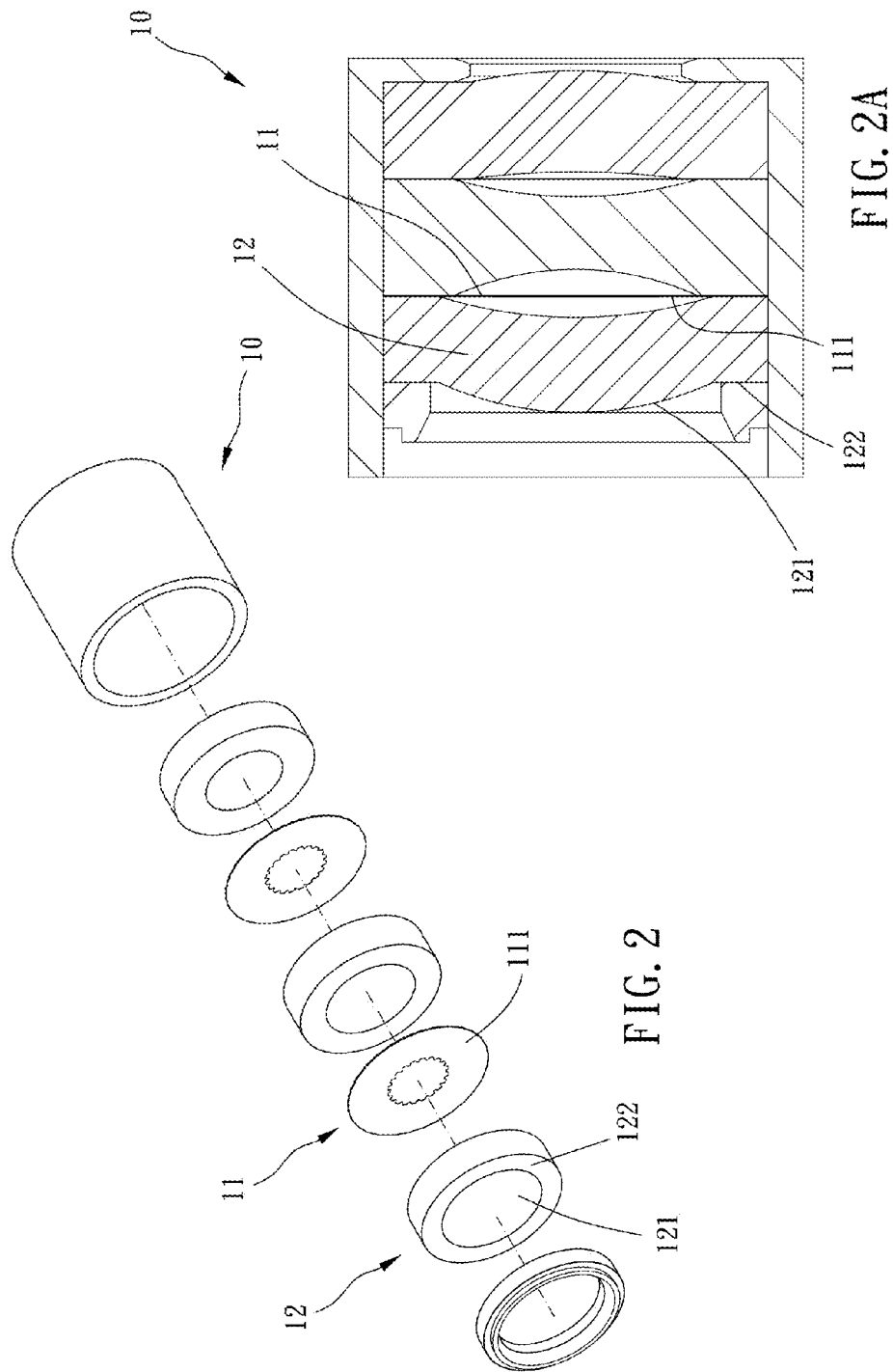

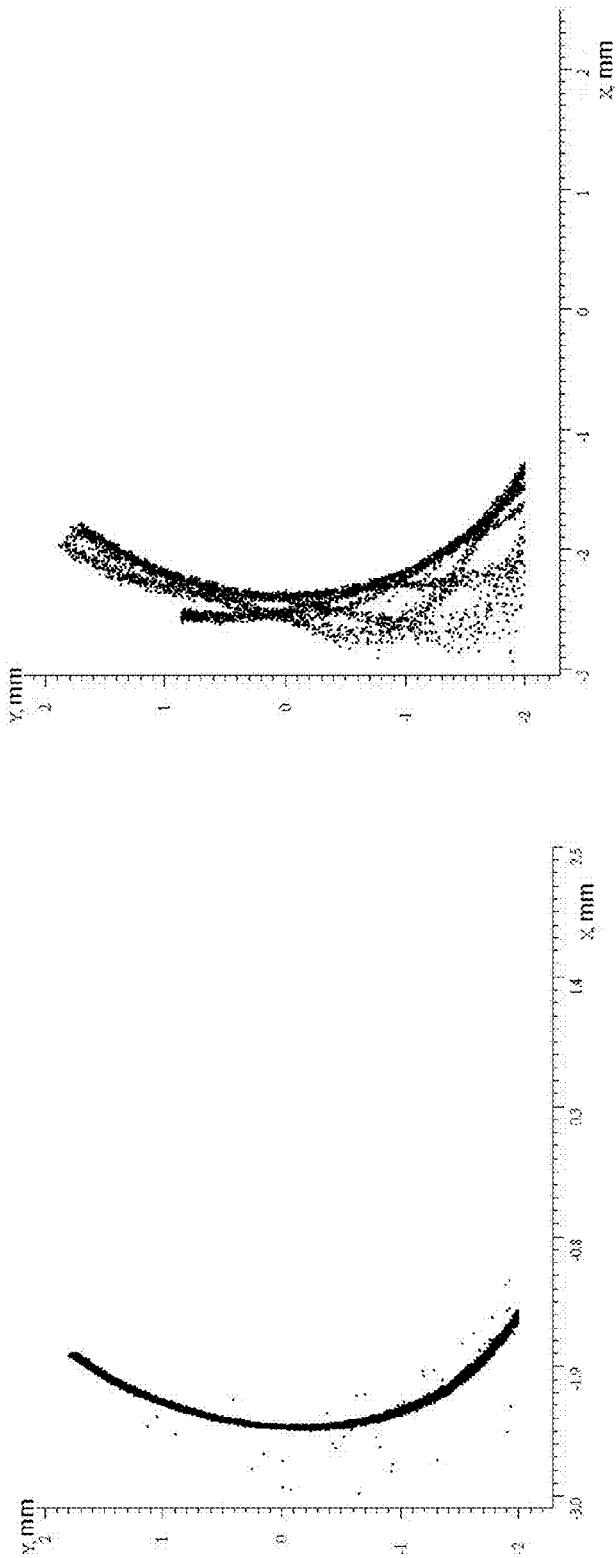

LIGHT BLOCKING PLATE AND LENS ASSEMBLY INCLUDING THE SAME

BACKGROUND OF THE INVENTION

1. Field of the Invention

The present invention relates to a light blocking plate and a lens assembly having light blocking plate.

2. Description of the Prior Art

Conventional lens assembly is usually disposed with light blocking plate, as disclosed in patent publications TW 201020089, TW 201123869, and TW 201307935. In general, the inner rim of the light blocking plate is annular and smooth so that stray light concentrates too much to result halo disturbance. As a result, performance of imaging is affected.

SUMMARY OF THE INVENTION

The main object of the present invention is to provide a light blocking plate and a lens assembly including the light blocking plate, which are able to reduce halo disturbance caused by stray light.

To achieve the above and other objects, a light blocking plate of the present invention adapted for being installed on a lens wherein the lens has an optical portion and a positioning portion surrounding the optical portion includes an annular body which is formed with a through hole at a central portion thereof. The annular body has a first face and a second face. The annular body has an inner rim and an outer rim. The through hole is defined by the inner rim. One of the first face and the second face is adapted for being disposed on the positioning portion of the lens. The inner rim is formed with a plurality of notches so that the inner rim has a contour which is not smooth circular.

To achieve the above and other objects, a lens assembly including the light blocking plate previously mentioned is also provided. The lens assembly further includes at least one lens. The lens has an optical portion and a positioning portion surrounding the optical portion. One of the first face and the second face is disposed on the positioning portion of the lens.

Thus, stray light can be dispersed to reduce halo disturbance.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is a breakdown drawing showing a lens assembly of the present invention;

FIG. 2A is a profile showing a lens assembly of the present invention;

FIGS. 9A, 10A, 11A, and 12A are energy distribution drawings of prior art;

FIGS. 9B, 10B, 11B, and 12B are energy distribution drawings of the present invention.

DETAILED DESCRIPTION OF THE PREFERRED EMBODIMENTS

Figure 3A:
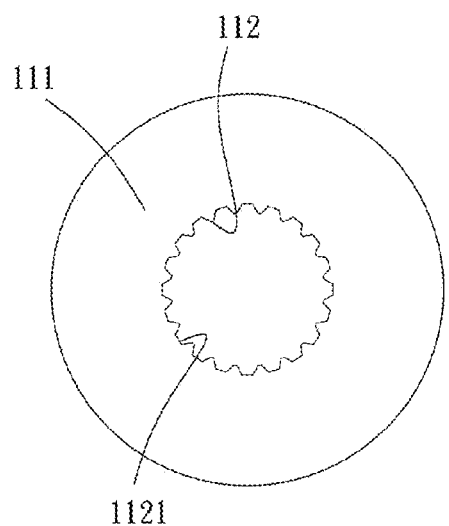
FIG. 3A is a front view showing a light blocking plate of the present invention.
Figure 3B:
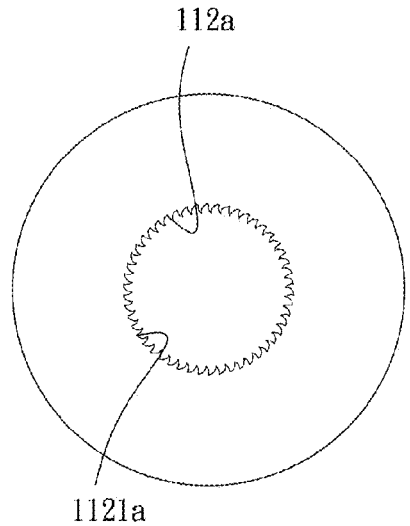
FIGS. 3B to 3D are front views of second to fourth embodiment of the present invention.

Please refer to FIG. 2 to FIG. 3A, the light blocking plate 11 of the present invention is adapted for being disposed on a lens 12, such as a lens of camera or lens for invisible light. The lens 12 has an optical portion 121 and a positioning portion 122 surrounding the optical portion 121. The light blocking plate 11 includes an annular body 111 having a through hole at a central portion thereof. The annular body 111 defines a first face and a second face. The annular body 111 has an inner rim 112 and an outer rim. The through hole is defined by the inner rim 112. One of the first face and the second face is adapted for being disposed on the positioning portion 122 of the lens 12. A portion of the inner rim 112 closest to a center of the through hole is formed with a plurality of notches 1121 so that the inner rim 112 has a contour which is not smooth circular. In addition, each of the notches 1121 penetrates the annular body 111 along an axial direction defined by the annular body 111. Preferably, the inner rim 112 is substantially parallel to the axial direction of the annular body 111, and the inner rim 112 is formed with at least ten notches 1121 which are arranged in interval.

In the present embodiment, each notch 1121 has radial cross-section which is trapezoid and has a bottom smaller than an opening thereof, as shown in FIG. 3A. Preferably, a radial depth of each notch 1121 is larger than one tenth of an inner diameter of the through hole. More preferably, the radial depth of each notch 1121 is approximately one ninth of an inner diameter of the through hole. As a result, the notch 1121 has larger depth so that the notch 1121 is quite obvious visually.

Figure 3C:
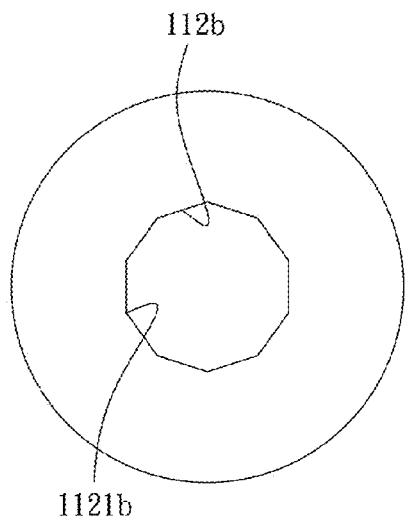
Figure 3D:
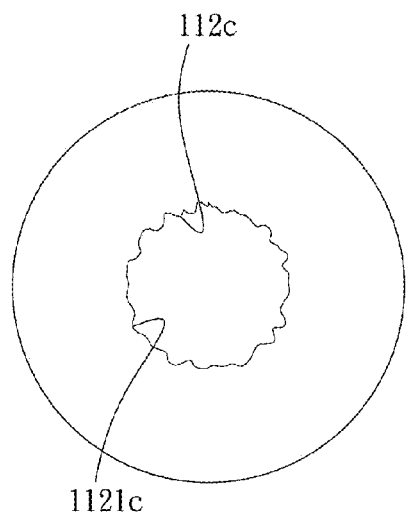
Figure 4:
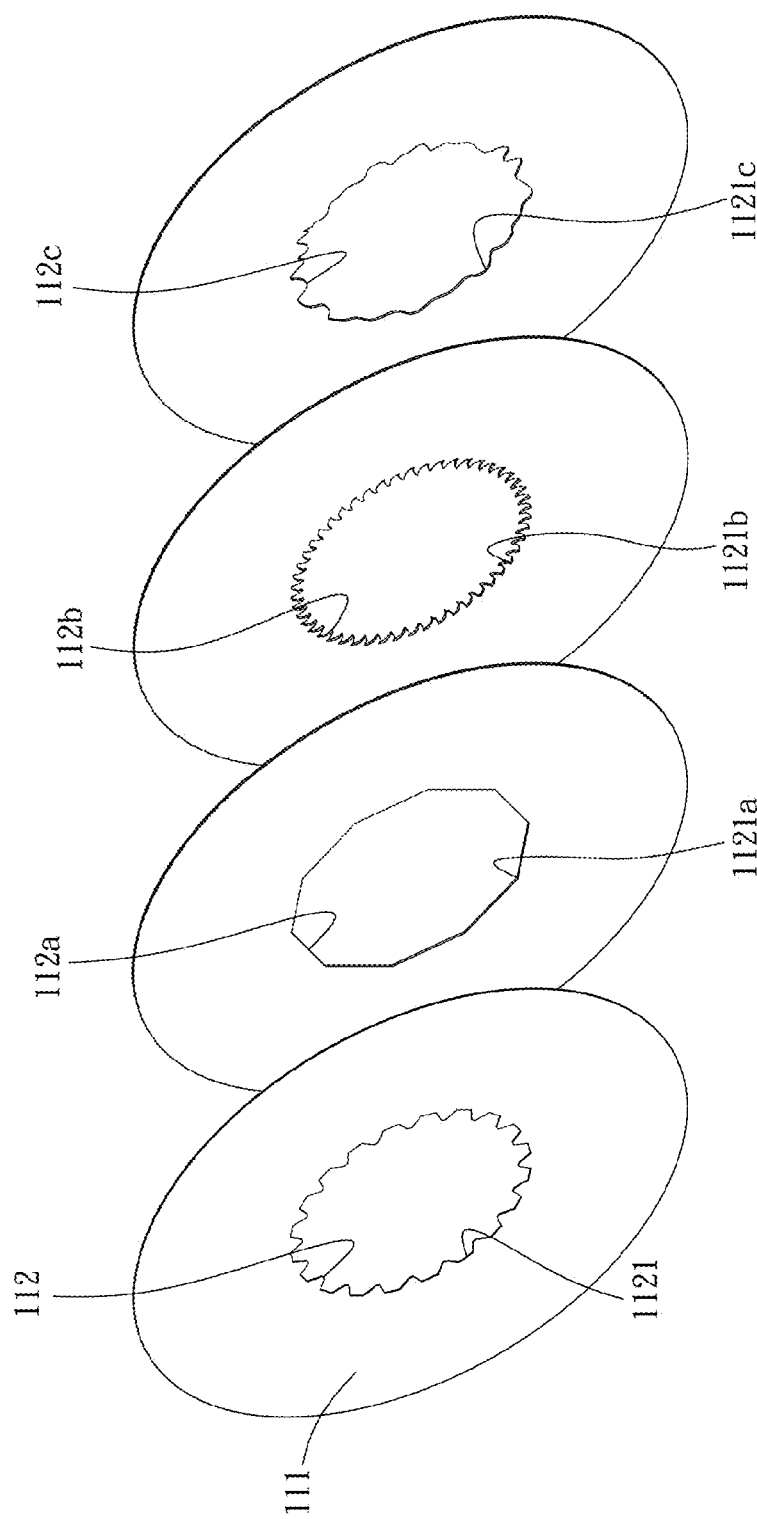
FIG. 4 is a stereogram showing a light blocking plate of the present invention.

Please refer to FIGS. 3B to 3D and FIG. 4, in other possible embodiments, various types of the inner rims 112,112a,112b, 112c and notches 1121,1121a,1121b,1121c are provided. For example, in FIG. 3B, each notch 1121a has a radial cross-section which is horn-shaped, and each notch 1121a has two side walls which are cambered and concave respectively. In addition, each notch 1121a has an opening whose width is smaller than a radial depth of the notch 1121a. Preferably, approximately 50 notches 1121a are provided, and the radial depth of the notch 1121a is approximately one ninth of the inner diameter of the through hole. In FIG. 3C, the notch 1121b is one of the corners of polygon. In FIG. 3D, the inner rim 112c is uneven, and the notches 1121c have various shapes. More specifically, the notches 1121c have different shapes, depths, intervals, and widths to make the inner rim 1121c look uneven.

Figure 5:
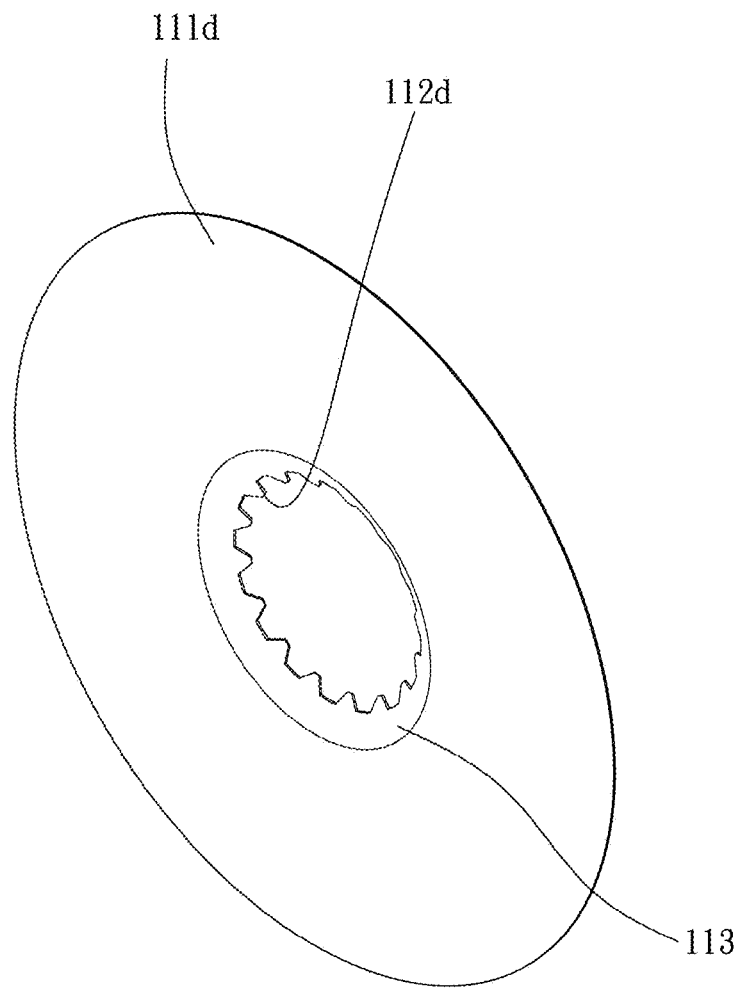
FIG. 5 is a stereogram showing a light blocking plate of a fifth embodiment of the present invention.

Please refer to FIG. 5 for another embodiment, the annular body 111d is formed with a skirt-shaped flange 113. The inner rim 112d is formed on the skirt-shaped flange 113. The skirt-shaped flange 113 is not parallel to both the first face and the second face of the annular body 111d, and the skirt-shaped flange 113 is protruded above the annular body 111d. As a result, the inner rim can be kept away from cambered face of adjacent lens.

Figure 6:
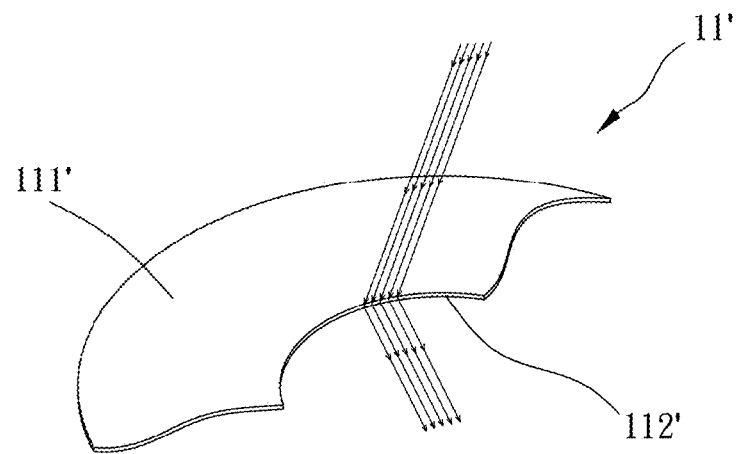
FIG. 6 is an illustration of prior art.
Figure 7:
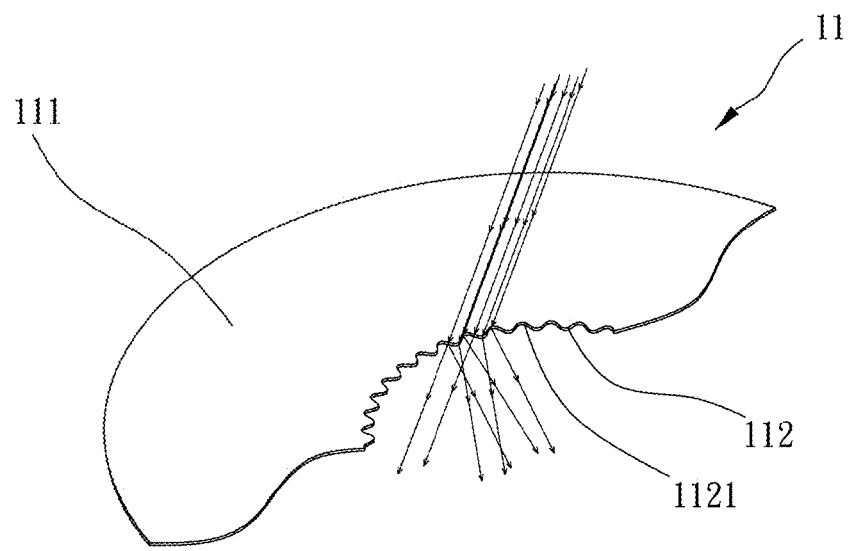
FIG. 7 is an illustration of the present invention.
Figure 10A:
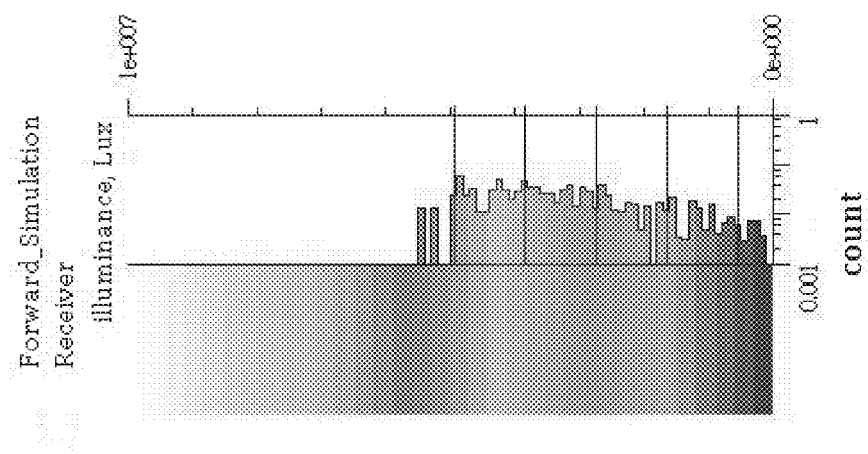

Concerning the mechanism of the present invention, please refer to FIGS. 6 and 7. A conventional light blocking plate 11' also has an annular body 111'. The annular body 111' has a smooth and annular inner rim 112'. As a result, incident light is concentrated to make stray light concentrate to form halo disturbance, as shown in FIG. 6. In the present invention, the inner rim 112 is formed with notches 1121 so that the reflection face is uneven. As a result, stray light is dispersed so as to reduce halo disturbance, as shown in FIG. 7.

Figure 8A:
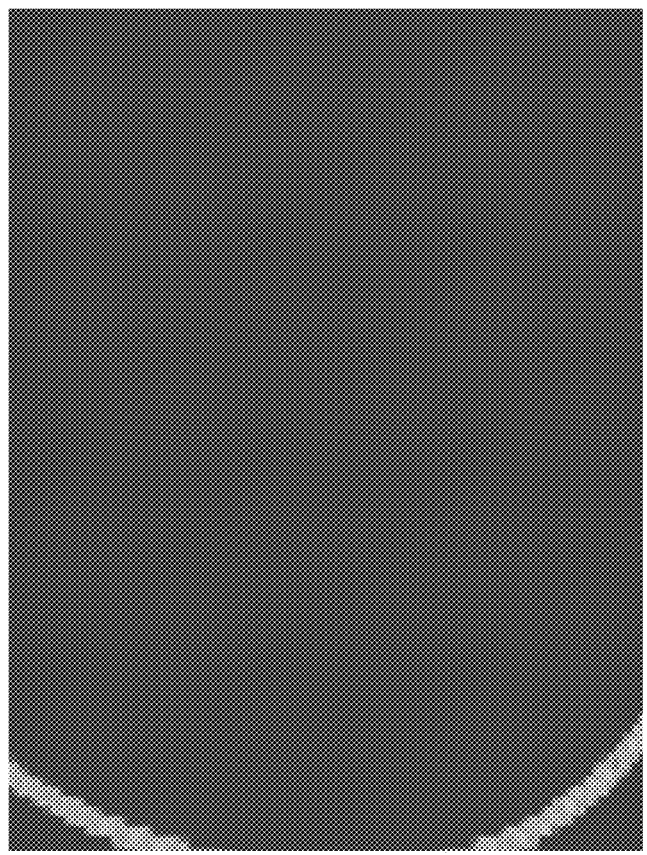
FIG. 8A is an energy simulation drawing of prior art.
Figure 10B:
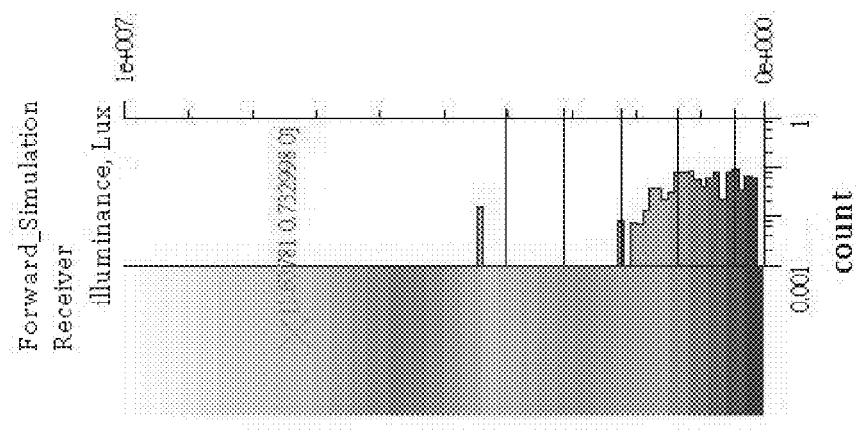
Figure 8B:
FIG. 8B is an energy simulation drawing of the present invention.
Figure 11A:
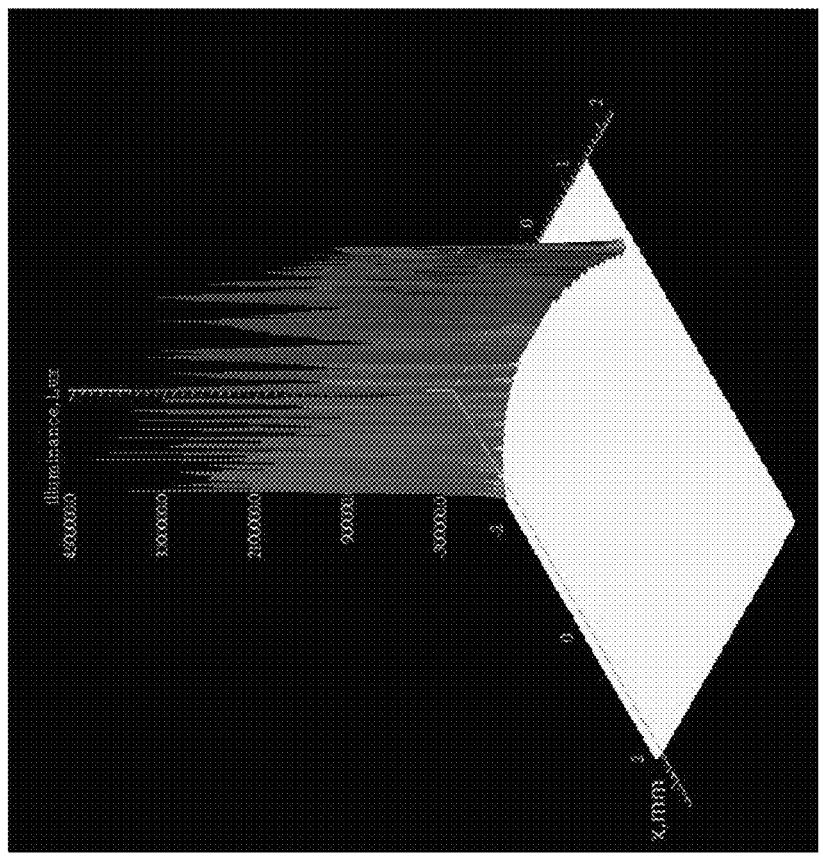
Figure 11B:
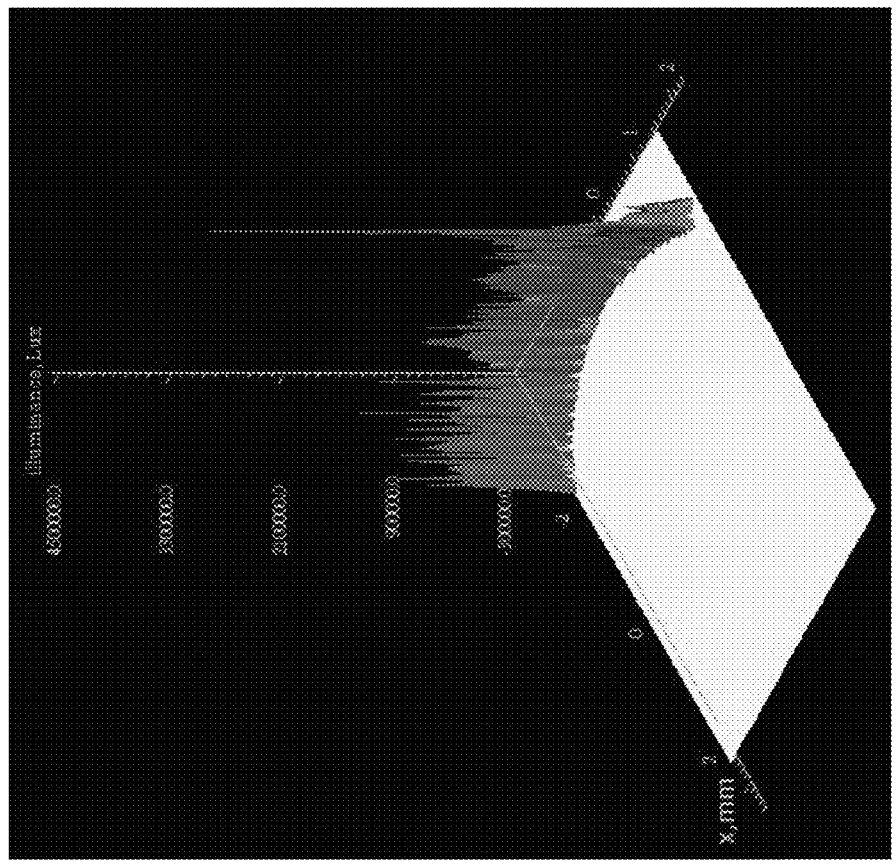
Figure 12A:
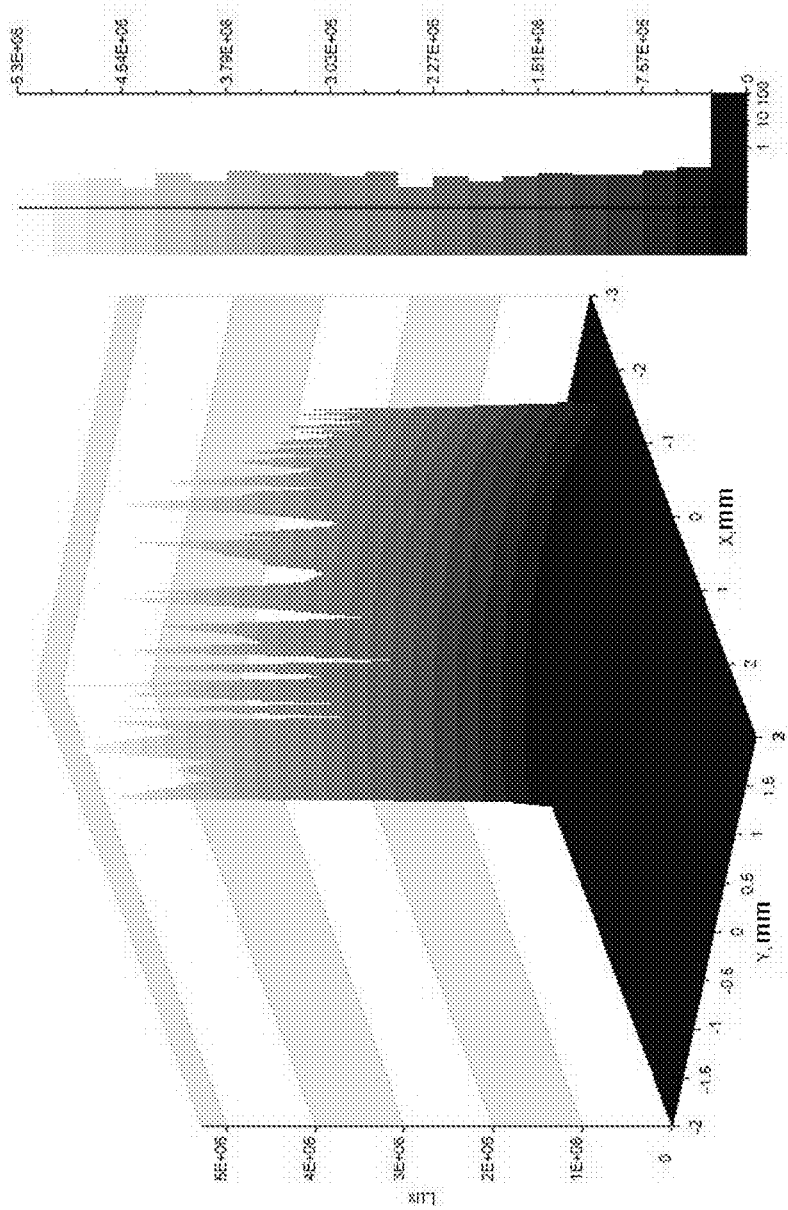
Figure 12B:
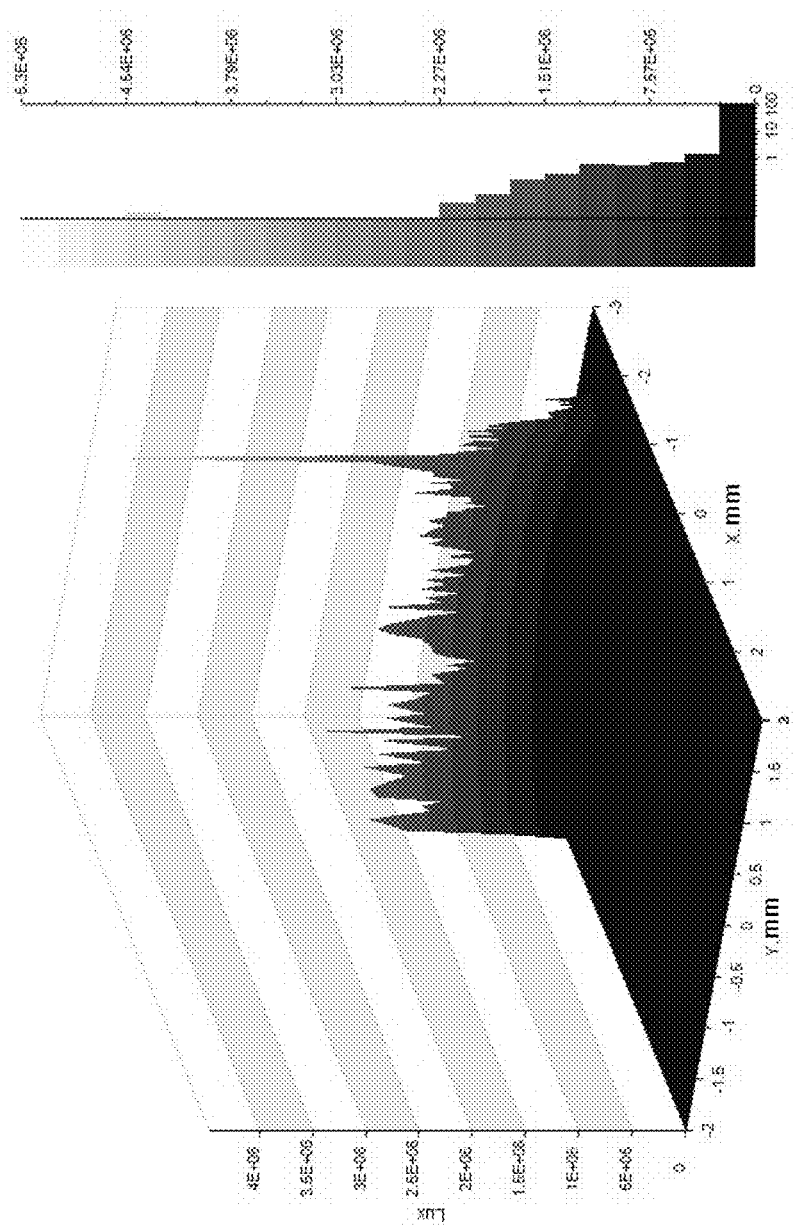

In experiments, please refer to FIGS. 8A to 12B, experiments of the prior art and the present invention are taken under the same conditions. In FIGS. 8A and 9A for prior art, it is obvious that stray light quite concentrates to result a clear halo disturbance. On the contrary, in FIGS. 8B and 9B for the present invention, the stray light is dispersed to result vague halo disturbance. Now please refer to FIGS. 10A, 11A, and 12A, summation luminosity (also energy) of the prior art is higher (lower portion of FIG. 10A shows light in lower energy). On the contrary, in FIGS. 10B, 11B, and 12B, summation luminosity (also energy) of the present invention is lower (lower portion of FIG. 10B shows light in lower energy). In view of the experiments, it is convinced that the halo disturbance of the present invention is reduced with respect to the prior art.

Figure 1:
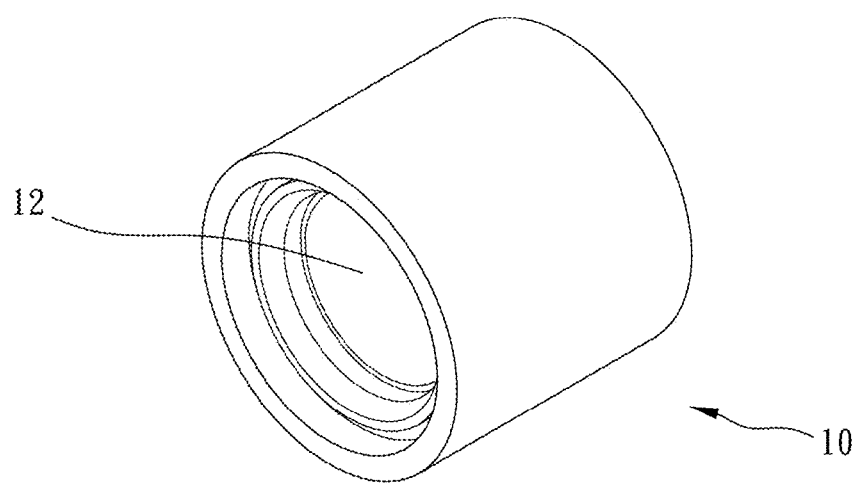
FIG. 1 is a stereogram showing a lens assembly of the present invention.

The present invention also provides a lens assembly 10, as shown in FIGS. 1 to 2A. The lens assembly 10 includes the light blocking plate 11 and at least one lens 12 which has an optical portion 121 and a positioning portion 122 surrounding the optical portion 121. One of the first face and the second face of the annular body 111 is disposed on the positioning portion 121 of the lens 10.

In conclusion, the deeper notches make the reflection face uneven so as to disperse stray light. Thus, halo disturbance is reduced. In addition, the light blocking plate of the present invention has a simple structure and is easy to manufacture.

What is claimed is:

1. A light blocking plate, adapted for being installed on a lens wherein the lens has an optical portion and a positioning portion surrounding the optical portion, the light blocking plate including an annular body which is formed with a through hole at a central portion thereof, the annular body having a first face and a second face, the annular body having an inner rim and an outer rim, the through hole being defined by the inner rim, one of the first face and the second face being adapted for being disposed on the positioning portion of the lens, a portion of the inner rim closest to a center of the through hole being radially formed with a plurality of notches so that the inner rim has a contour which is not smooth circular; wherein each of the notches penetrates the annular body along an axial direction defined thereby.

2. The light blocking plate of claim 1, wherein the inner rim is formed with at least 10 notches which are arranged in interval.

3. The light blocking plate of claim 1, wherein the notches have various shapes.

4. The light blocking plate of claim 1, wherein each notch has a radial cross-section which is horn-shaped, and each notch has two side walls which are cambered and concave respectively.

5. The light blocking plate of claim 4, wherein each notch has an opening whose width is smaller than a radial depth of the notch.

6. The light blocking plate of claim 1, wherein each notch has a radial cross-section which is trapezoid and a bottom smaller than an opening thereof.

7. The light blocking plate of claim 1, wherein the annular body is formed with a skirt-shaped flange, the inner rim is formed on the skirt-shaped flange, the skirt-shaped flange is not parallel to both the first face and the second face of the annular body, and the skirt-shaped flange is protruded above the annular body.

8. The light blocking plate of claim 1, wherein a radial depth of each notch is larger than one tenth of an inner diameter of the through hole.

9. A lens assembly, including a light blocking plate of claim 1, further including at least one lens, the lens has an optical portion and a positioning portion surrounding the optical portion, one of the first face and the second face is disposed on the positioning portion of the lens.

10. The lens assembly of claim 9, wherein the inner rim is formed with at least 10 notches which are arranged in interval.

11. The lens assembly of claim 9, wherein the notches have various shapes.

12. The lens assembly of claim 9, wherein each notch has a radial cross-section which is horn-shaped, and each notch has two side walls which are cambered and concave respectively.

13. The lens assembly of claim 12, wherein each notch has an opening whose width is smaller than a radial depth of the notch.

14. The lens assembly of claim 9, wherein each notch has a radial cross-section which is trapezoid and a bottom smaller than an opening thereof.

15. The lens assembly of claim 9, wherein the annular body is formed with a skirt-shaped flange, the inner rim is formed on the skirt-shaped flange, the skirt-shaped flange is not parallel to both the first face and the second face of the annular body, and the skirt-shaped flange is protruded above the annular body.

16. The lens assembly of claim 9, wherein a radial depth of each notch is larger than one tenth of an inner diameter of the through hole.

* * * * *